(12) United States Patent
Shigetaka

(10) Patent No.: US 7,737,952 B2
(45) Date of Patent: Jun. 15, 2010

(54) ELECTROSTATIC-CAPACITANCE-TYPE COORDINATE INPUT DEVICE

(75) Inventor: Hiroshi Shigetaka, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 359 days.

(21) Appl. No.: 10/618,864

(22) Filed: Jul. 14, 2003

(65) Prior Publication Data

US 2004/0022010 A1 Feb. 5, 2004

(30) Foreign Application Priority Data

Jul. 16, 2002 (JP) ............... 2002-206830

(51) Int. Cl.
G06F 3/041 (2006.01)
G06F 3/044 (2006.01)

(52) U.S. Cl. .................... 345/173; 178/18.06

(58) Field of Classification Search ......... 345/173–177; 178/18.01–18.06
See application file for complete search history.

(56) References Cited

U.S. PATENT DOCUMENTS

| 4,587,378 | A | * | 5/1986 | Moore | 345/173 |
|---|---|---|---|---|---|
| 4,931,782 | A | * | 6/1990 | Jackson | 345/174 |
| 5,159,159 | A | * | 10/1992 | Asher | 178/18.05 |
| 5,565,657 | A | * | 10/1996 | Merz | 178/18.01 |
| 5,861,875 | A | * | 1/1999 | Gerpheide | 345/174 |
| 5,920,310 | A | | 7/1999 | Faggin et al. | 345/173 |
| 6,096,984 | A | * | 8/2000 | Howell et al. | 178/18.01 |
| 6,262,717 | B1 | * | 7/2001 | Donohue et al. | 345/173 |
| 6,473,069 | B1 | * | 10/2002 | Gerpheide | 345/157 |
| 6,680,731 | B2 | * | 1/2004 | Gerpheide et al. | 345/173 |
| 2001/0024194 | A1 | * | 9/2001 | Shigetaka et al. | 345/173 |
| 2003/0025679 | A1 | * | 2/2003 | Taylor et al. | 345/175 |

* cited by examiner

*Primary Examiner*—Bipin Shalwala
*Assistant Examiner*—Steven E Holton
(74) *Attorney, Agent, or Firm*—Brinks Hofer Gilson & Lione

(57) ABSTRACT

An input sensor is bonded on the rear surface of an insulating support plate which supports the input sensor. By forming the input sensor to be thin, a device in which an input device having the input sensor is incorporated can be formed very thin.

8 Claims, 8 Drawing Sheets

ELECTROSTATIC-CAPACITANCE-TYPE COORDINATE INPUT DEVICE

BACKGROUND OF THE INVENTION

1. Field of the Invention

The present invention relates to an electrostatic-capacitance-type coordinate input device used as a pointing device for a personal computer and, more particularly, to a thin input device.

2. Description of the Related Art

FIG. 11 is a sectional view showing a conventional input device in a simplified manner. This input device 100 is of a pad type, which is one type of pointing device incorporated in a notebook personal computer.

In this input device 100 shown in FIG. 11, an X electrode layer 103 formed of a plurality of X electrodes 102 is multilayered on the top surface of a film substrate 101 made of a synthetic resin, and a Y electrode layer 105 formed of a plurality of Y electrodes 104 is multilayered on the underside of the film substrate 101. The X electrode 102 and the Y electrode 104 are arranged in a lattice form.

The surfaces of the X electrode layer 103 and the Y electrode layer 105 are coated with insulating films 106 and 107, respectively. Next, a surface sheet 108 is disposed on the X electrode layer 103 side, which is the operation surface side. All the outer dimensions of the electrode layers 103 and 105, the insulating films 106 and 107, and the surface sheet 108 are formed as the same rectangle.

Furthermore, a control circuit substrate 110 is disposed in the bottommost layer on a side opposite to the surface sheet 108, and a control circuit 111 is disposed on a surface opposite to the film substrate 101. The control circuit substrate 110 is also formed with outer dimensions which are the same as those of the film substrate 101.

Furthermore, in the input device 100, through holes (not shown) are formed in the film substrate 101, the insulating film 107, and the control circuit substrate 110. The X electrode layer 103 and the Y electrode layer 105 are made to electrically conduct with each other, so that a signal based on the electrostatic capacitance detected by the X electrode layer 103 and the Y electrode layer 105 is sent to the control circuit 111.

However, in the above-described conventional input device 100, since all the electrode layers 103 and 105 including the film substrate 101 are provided on the control circuit substrate 110, the thickness dimensions of the entire input device become large, and when the input device 100 is incorporated in a notebook personal computer (PC), the thickness dimensions of the PC cannot be made thinner. Furthermore, since the control circuit substrate 110 becomes the same size (area) as that of the film substrate 101, costs are increased.

In order to mount the input device 100 on a PC housing, etc., a support plate made of metal is mounted on the input device 100, and the support plate is screwed in to the PC housing. Furthermore, a rectangular opening for the input device 100 is formed in the PC housing, for example, in front of the keyboard, so that the input device is exposed from the surface of the PC housing, and the input device is provided in the opening.

When installing in the PC housing, a support plate and an opening are necessary, costs are increased, and the flexibility of design of the PC housing is decreased due to the formation of the opening.

SUMMARY OF THE INVENTION

The present invention aims to overcome such problems of the conventional art. An object of the present invention is to provide an input device which can be formed thin so as to improve the flexibility of design of the PC housing.

In order to achieve the above object, the present invention provides an electrostatic-capacitance-type coordinate input device comprising an input sensor formed in such a manner that an X electrode layer and a Y electrode layer for detecting electrostatic capacitance are multilayered on a flexible substrate, wherein the input sensor is bonded on the rear surface of an insulating support plate for supporting the input sensor. As a result of employing such a configuration, it is possible to operate the thin input sensor bonded on the rear surface of the support plate from the top surface of the support plate.

A recess to which the input sensor is fitted may be formed on the rear surface of the support plate at a position where the input sensor is bonded. As a result of employing such a configuration, the input sensor can be housed almost completely within the plate thickness of the support plate, and operation can be performed more satisfactorily from the top surface of the support plate whose thickness is made thin.

A pointing section for pointing the position of the input sensor may be formed in the support plate. As a result of employing such a configuration, it is possible for an operator to easily know the position of the input sensor supported on the rear surface of the support plate.

As described in the foregoing, according to the present invention, the input device can be formed thin.

More specifically, since the input sensor is bonded on the rear surface of the insulating support plate which supports the input sensor, the input sensor can be formed thin, a device in which the input device is incorporated can be formed very thin, and the input sensor can also be incorporated so as to be arranged along a curve.

If a recess to which the input sensor is fitted is formed on the rear surface of the support plate at a position where the input sensor is bonded, the input sensor can be housed almost completely within the plate thickness of the support plate, and operation can be performed more satisfactorily from the top surface of the support plate whose thickness is made thin.

If a pointing section for pointing the position of the input sensor is formed in the support plate, it is possible for an operator to easily know the position of the input sensor supported on the rear surface of the support plate.

DESCRIPTION OF THE PREFERRED EMBODIMENTS

Figure 1:
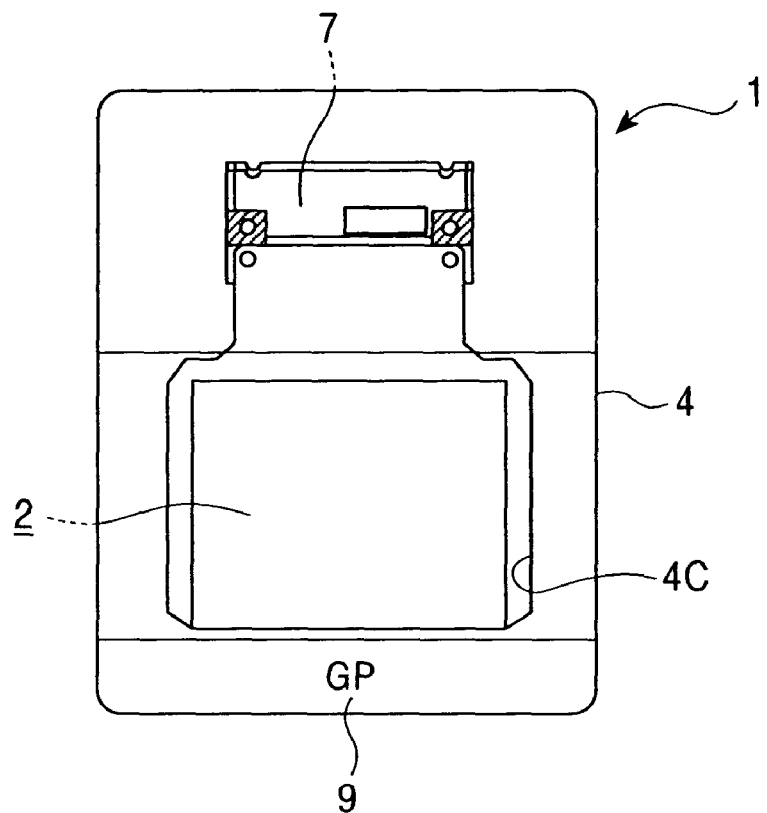
FIG. 1 is a plan view showing an embodiment of an input device according to the present invention.
Figure 2:
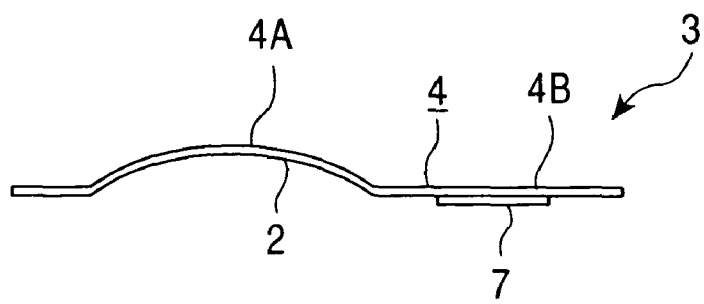
FIG. 2 is a right side view of a personal computer of FIG. 1.
Figure 3:
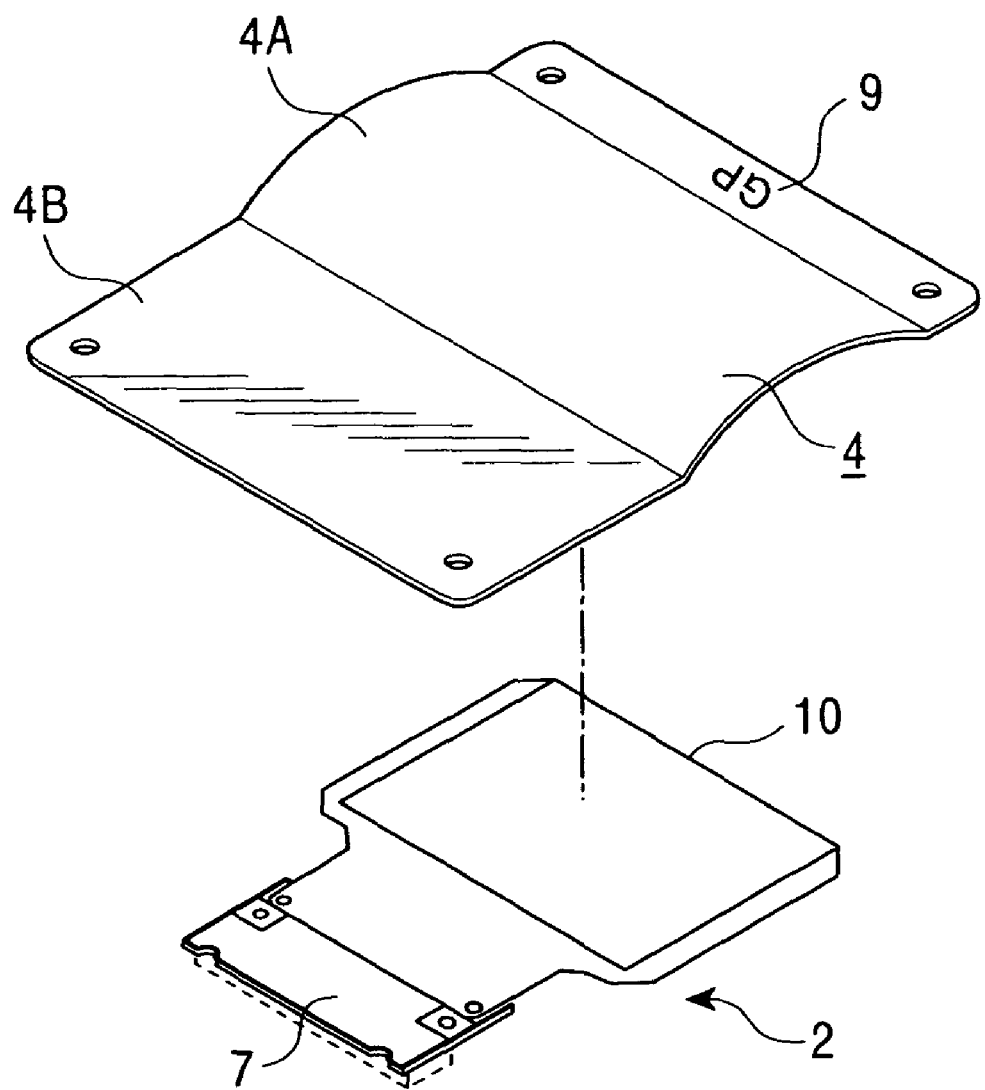
FIG. 3 is an exploded perspective view of the input device of FIG. 1.

FIGS. 1 to 3 show an embodiment of an input device according to the present invention. In this embodiment, an electrostatic-capacitance-type coordinate input device 1 used as a pointing device for a personal computer (PC) has an input sensor 2 formed from a flexible material such as a film. This input sensor 2 is disposed on the rear surface of a housing 4 in a PC 3.

Figure 5:
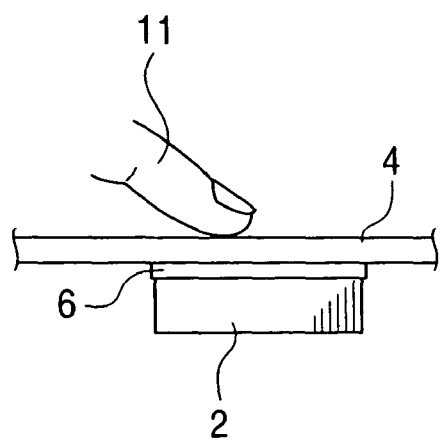
FIG. 5 is a longitudinal sectional view of the essential portion of the PC of FIG. 4.

The input device 1 is of an electrostatic-capacitance type. As shown in FIG. 5, when a conductor such as a finger 11 is brought into contact with or in close proximity to the input sensor 2, variations in electrostatic capacitance occur. By electrically detecting the capacitance variations, the position of the finger 11, etc., can be detected.

Figure 4:
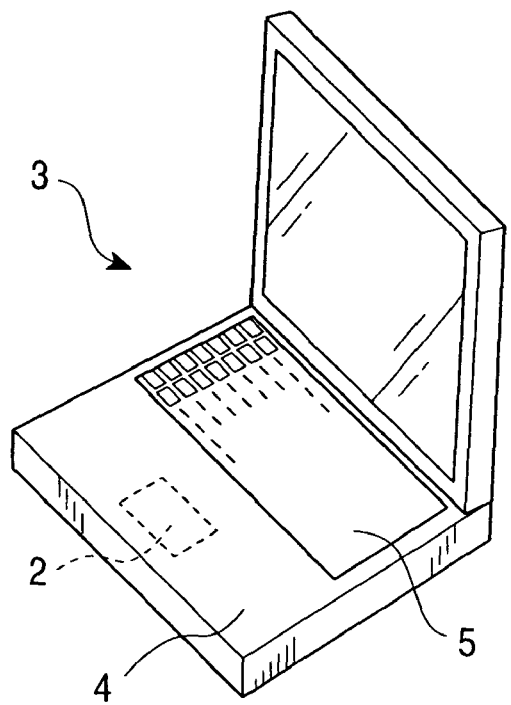
FIG. 4 is an overall perspective view of a PC, which shows a position at which the input device of FIG. 1 is disposed.

The input sensor 2, as shown in FIGS. 4 and 5, is bonded on the rear surface of a planar housing 4 in front of a keyboard 5 in the PC 3, is fixed by using a double-sided bonding tape 6 or a bonding agent, and is not seen from the surface of the PC 3. The housing 4 is formed of an insulating material made of a molded resin. The thickness at the place where the input sensor 2 is bonded is less than or equal to approximately 2 mm, and more preferably, is less than or equal to 1 mm. Since the input sensor 2 is of an electrostatic capacitance type, when the proximity distance to the finger 11, etc., is greater than 2 mm, the sensitivity becomes poor, and therefore, the proximity distance must be less than 2 mm.

As shown in FIGS. 1 to 3, it is also possible to form a curved section 4A in a portion of the housing so as to bond the input sensor 2 on the rear surface of the curved section 4A. This is because the input sensor 2 can be bonded along the curved surface of the curved section 4A since the input sensor 2 is formed of a film, etc. Furthermore, if the input sensor 2 is bonded on the rear surface of the curved section 4A in this manner, by an operator tracing the surface of the curved section 4A when performing a pointing operation, the operation feeling is improved more than when tracing a planer surface.

Since the input device 1 is formed of the input sensor 2 in the form of a thin film and can be bonded on the rear surface of the housing 4, the input device 1 can be placed anywhere on the housing 4 of the PC 3, the flexibility of design is improved, and there are no limitations of design.

On the other hand, the details of the input sensor 2 are shown in FIGS. 6 to 9.

Figure 6:
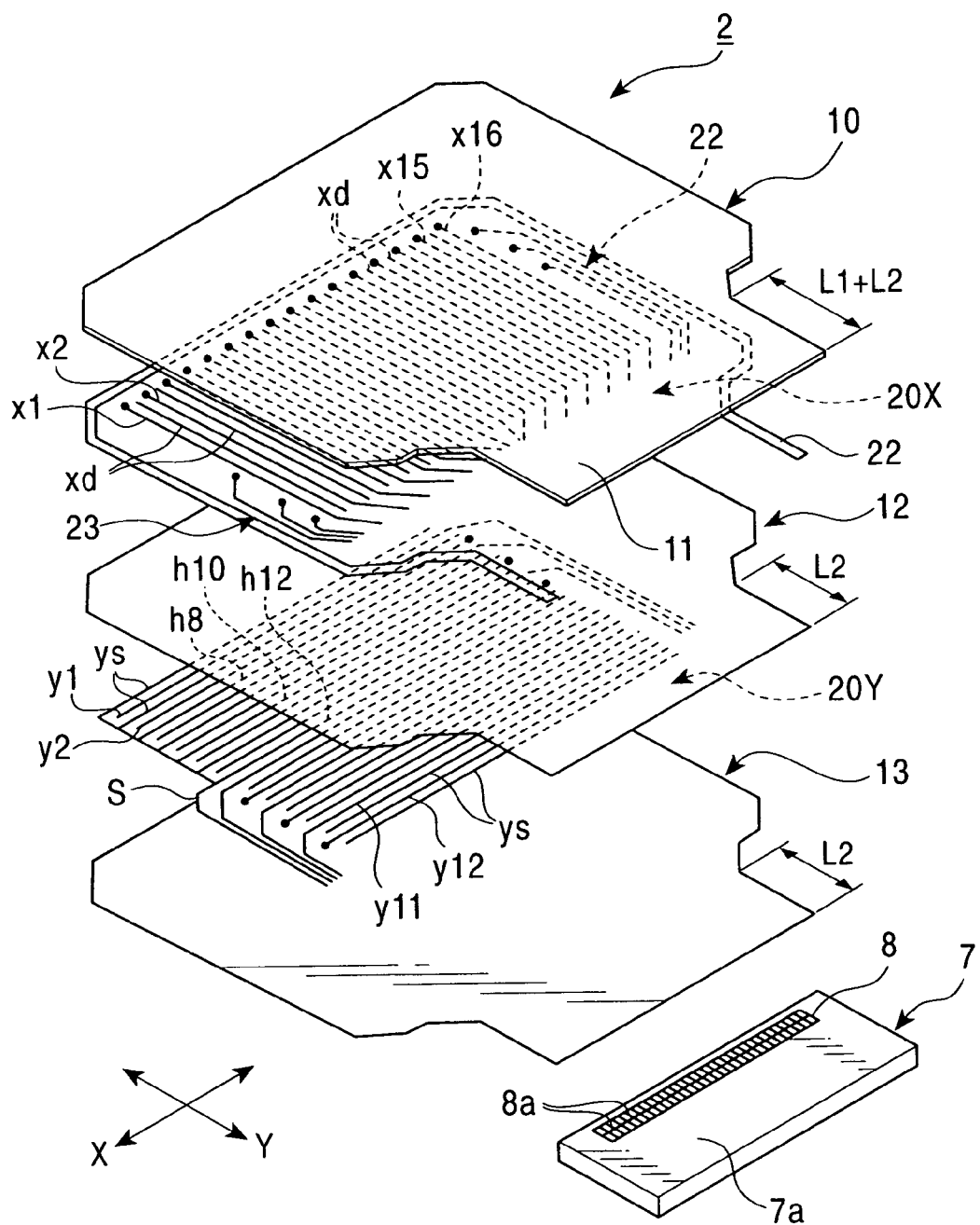
FIG. 6 is an exploded perspective view showing details of the input sensor of FIG. 1.

In FIGS. 6 to 9, the input sensor 2 has a flexible film substrate 10. This film substrate 10 is formed by an insulating synthetic resin sheet, such as PET (polyethylene terephthalate). In this film substrate 10, as shown in FIG. 6, an extension section 11 whose one side in its longitudinal direction protrudes toward the side is formed.

An X electrode layer 20X is provided on the underside of the film substrate 10. In the X electrode layer 20X, as shown in FIG. 5, an X-direction driving electrode 20Xd, in which a plurality (16) of X electrodes x1, x2, . . . , x15, x16 are formed in parallel at a predetermined spacing in the X direction, is formed. One end of each of the X electrodes x1, x2, . . . , x15, x16 is formed so as to extend up to the extension section 11.

In the X electrode layer 20X formed in the film substrate 10, a dummy electrode xd (a total of 15) is alternately formed between electrodes of the X electrodes x1, x2, . . . , x15, x16. As a result of providing the dummy electrodes xd in this manner, for example, an influence when water is stuck to the input sensor 2 can be scattered.

On the film substrate 10, a grounding electrode 21 extending up to the extension section 11 along the edge portion of the film substrate 10 is formed flush with the X-direction driving electrode 20Xd. Furthermore, in the space formed between the X-direction driving electrode 20Xd of the film substrate 10 and the grounding electrode 21 thereof, X switching electrodes 22, 23, and 24 formed of a plurality of electrodes are formed. The X-direction driving electrode 20Xd, the grounding electrode 21, the X switching electrodes 22, 23, and 24 are all formed by a screen printing method using a silver paste or a silver-based paste.

The surface of each of the electrodes 20X, 21, 22, 23, and 24 is provided with a flexible insulating film 12 which is formed by coating or printing an insulating resin (resist). This resist can be selected from, for example, a polyamide type, an epoxy resin type, a polyurethane type, and a polyester type, etc. At this time, in the insulating film 12, as shown in FIG. 8, a plurality of through holes h1, h2, . . . , h12, k2, k4, . . . , k10, m2, m4, . . . , m10, and s2 are formed. These through holes are formed at positions corresponding to one of the end portions of the X switching electrodes 22, 23, and 24. The electrodes shown in FIG. 7, in which the through holes corresponding to FIG. 8 are not formed, are electrodes for inspection purposes.

Figure 8:
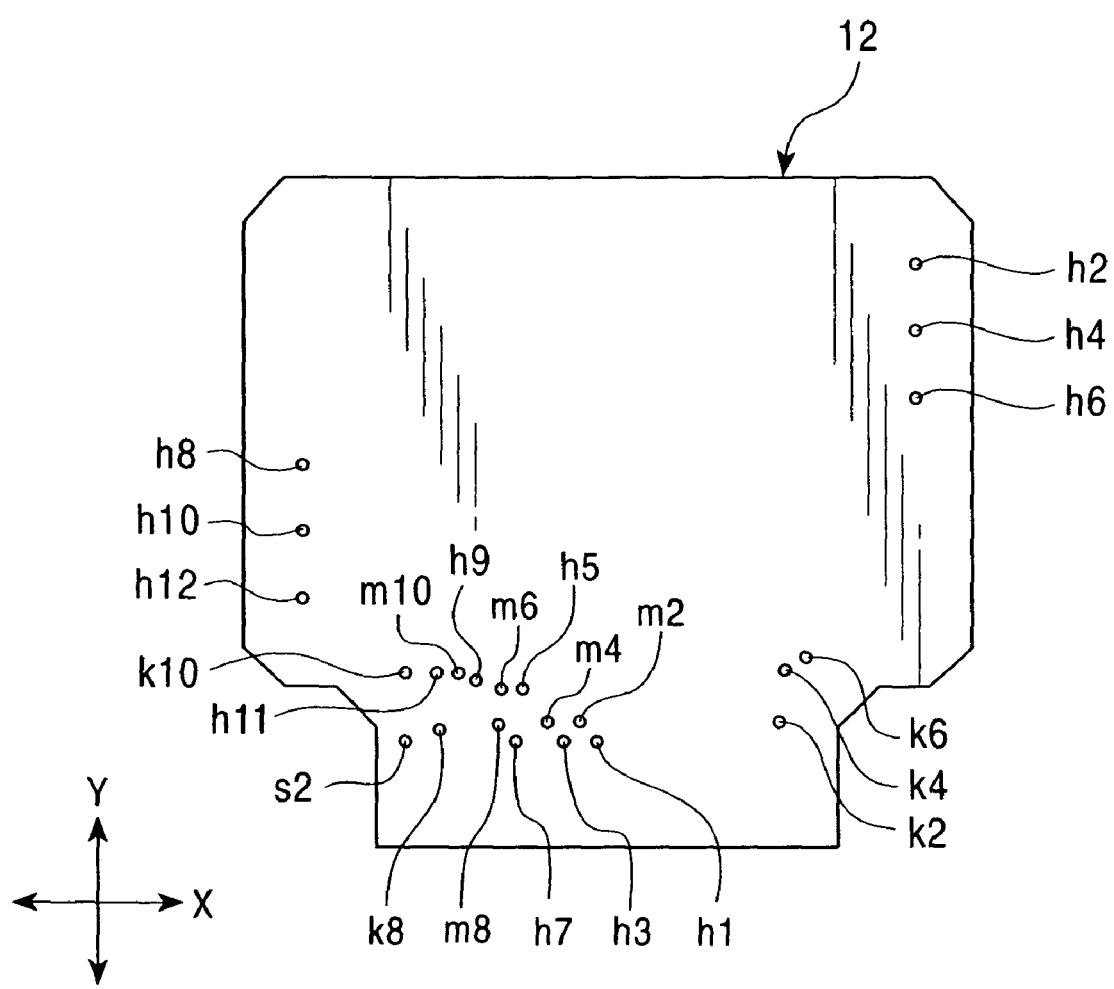
FIG. 8 is a plan view showing through holes formed in an insulating film of FIG. 6.
Figure 9:
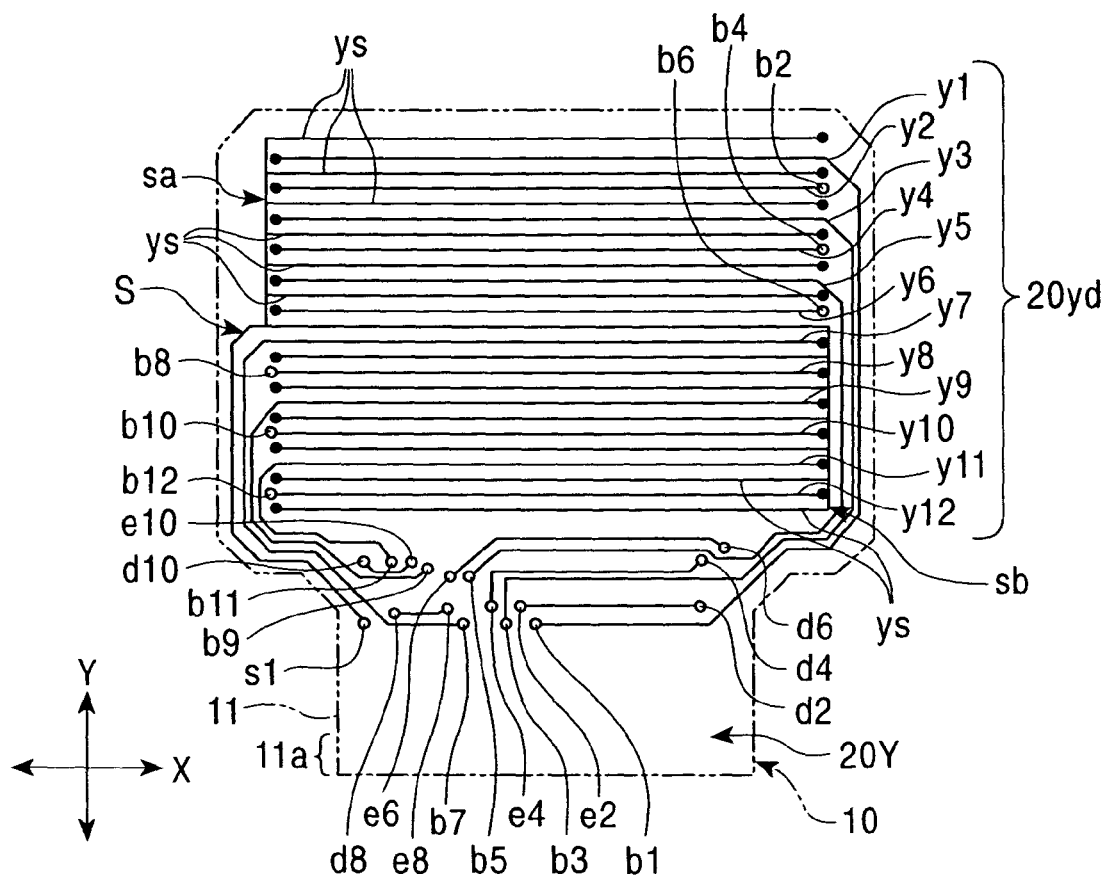
FIG. 9 is a circuit wiring diagram showing a Y electrode layer of FIG. 6.

As shown in FIG. 9, a Y electrode layer 20Y is provided on the surface (under surface) of the insulating film 12. In the Y electrode layer 20Y, a Y-direction driving electrode 20Yd formed of a plurality (12) of Y electrodes y1, y2, . . . , y11, y12 is formed in a direction intersecting at right angles to the X-direction driving electrode 20Xd. One end of each of the electrodes y1, y3, y5, y7, y9, and y11 of some of the Y electrodes y1, y2, . . . , y11, y12 is formed so as to extend from both sides on the right and left (X direction) up to the position of a predetermined through hole shown in FIG. 8.

On the surface (under surface) of the insulating film 12, a detection electrode S is provided in the same layer as that of the Y-direction driving electrode 20Yd. The detection electrode S is formed of comb-shaped electrodes sa and sb, and each electrode ys of the comb-shaped electrodes sa and sb is formed alternately with respect to the Y electrodes y1, y2, . . . , y11, y12. In the comb-shaped electrodes sa and sb, the front ends of the combs are formed opposite left to right, the comb-shaped electrodes sa and sb are clustered as one electrode in the center in the Y direction, and these extend up to the predetermined through holes shown in FIG. 8.

Figure 7:
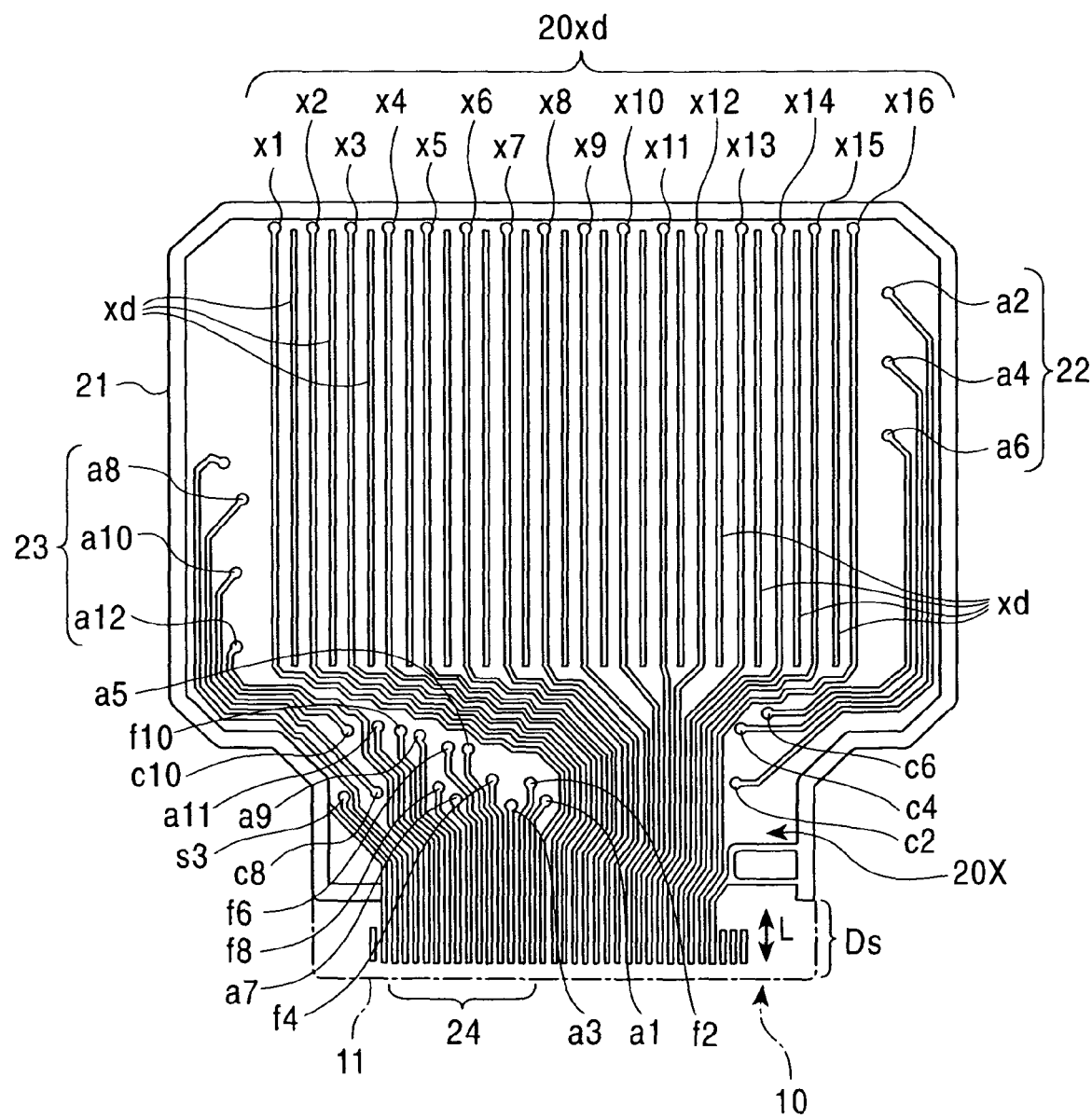
FIG. 7 is a circuit wiring diagram showing an X electrode layer of FIG. 6.

In FIG. 7, the X electrode layer 20X is shown as a white-on-black thick line, and in FIG. 9, the Y electrode layer 20Y is shown by a fine solid line. Both electrodes are formed by the electrodes of almost the same width.

Next, as shown in FIG. 6, a flexible insulating film 13 formed of an insulating resin similar to the insulating film 12 is formed by printing on the entire surface including the Y-direction driving electrode 20Yd.

As shown in FIG. 7, in the input device 1 of this embodiment, end portions Ds of all the electrodes of the X electrode layer 20X and all the electrodes of the Y electrode layer 20Y are guided to the end of the extension section 11 formed in the film substrate 10. On the surface (under surface) of the film substrate 10, since the protrusion dimension (L2) at which the insulating films 12 and 13 overlap the extension section 11 is formed shorter than the protrusion dimension (L1+L2) of the extension section 11, when the insulating films 12 and 13 are formed by being multilayered on the film substrate 10, the end portion Ds of the electrode layer formed on the surface of film substrate 10 is exposed at the surface (see FIG. 6). Next, the end portions Ds of the X electrode layer 20X and the Y electrode layer 20Y are connected to the conduction section 5 formed in the control circuit substrate 7. This control circuit substrate 7 is formed at an outer dimension which is sufficiently smaller than that of the film substrate 10. The portion of the dimension L, which is exposed at this time, is a region connected to the conduction section 5.

The control circuit substrate 7 is formed by a substrate 7a made of paper phenol, paper epoxy, or glass epoxy, with the conduction section 8 which is connected to the end portion Ds of the electrode layer being formed on one side surface of the substrate 7a. In the conduction section 8, a plurality of lands 8a are formed at a predetermined spacing in the X direction. The conduction section 8 can be formed by plating the metal surface of a steel foil or steel with gold or carbon thereon. When resistance and bonding strength are taken into consideration, a conduction section plated with gold is preferably used.

Since the entirety, excluding the control circuit substrate 7, of the input sensor 2 formed in this manner is flexible, the input sensor 2 is bonded within a recess 4C of the support plate 4 in such a manner so as to be arranged along the planar shape of the recess 4C by means of a double-sided bonding tape (not shown) which is bonded in advance within the recess 4C on the rear surface, which is formed from the curved section 4A of the support plate 4 to a planar section 4B thereof.

Furthermore, the control circuit substrate 7 connected to the input sensor 2 is bonded on the rear surface of the planar section 4B of the support plate 4 by means of a double-sided bonding tape (not shown).

On the other hand, in the front of the surface of the support plate 4, a pointing section 9 which points the position of the input sensor 2 positioned below the support plate 4 is formed. Therefore, it is possible for an operator to easily know the position of the input sensor supported on the rear surface of the support plate 2.

Figure 10:
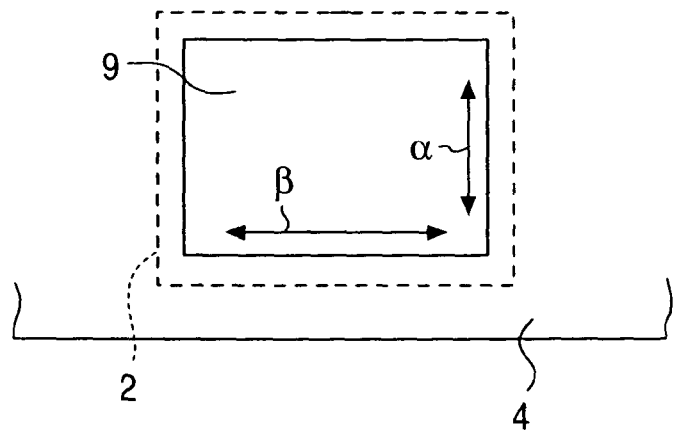
FIG. 10 is a plan view showing another embodiment of a pointing section.
Figure 11:
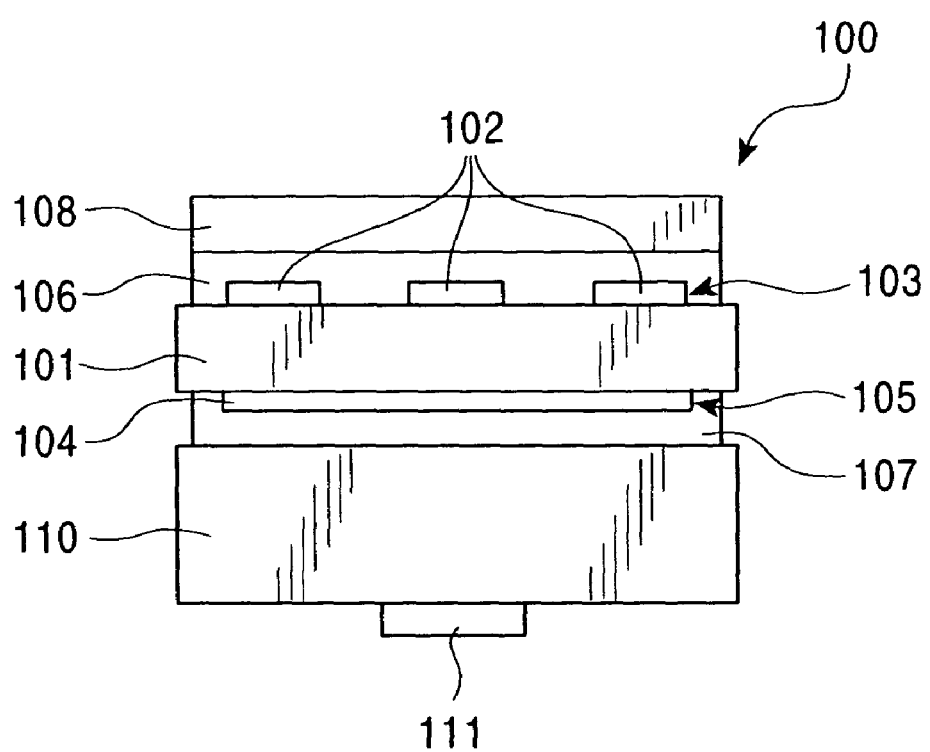
FIG. 11 is a longitudinal sectional view showing a conventional input device.

The ease of operation of the pointing section 9 is improved when, as shown in FIG. 10, a color display is made on the surface of the housing 4, surface roughness is varied, or arrows α and β in the scroll direction are displayed in such a manner as to correspond to the rectangular shape of the input sensor 2.

As has thus been described, since the input device 1 of this embodiment has the flexible thin input sensor 2, when the input device 1 is incorporated in the notebook PC 3, the thickness dimension of the PC 3 can be thinner. Furthermore, since the input device 1 can also be incorporated in the support plate 4, versatility of incorporation can be increased.

The planar shape of the control circuit substrate 7 can be made small, and the cost can be reduced.

Since the support plate 4 is made thinner by forming the recess 4C, it is possible to stably perform operation of the input device 1 from above the input sensor 2.

The present invention is not limited to the above-described embodiments, and various modifications are possible as necessary.

What is claimed is:

1. An input device comprising:
 an electrostatic-capacitance-type input sensor including a flexible substrate;
 a plurality of X electrodes that are formed on one surface of the flexible substrate and that are disposed on an insulating layer and a plurality of Y electrodes that are disposed on the insulating layer; and
 an extension section that is extended from the flexible substrate; and
 lead wiring of the X electrodes and the Y electrodes bundled in the extension section and connected to a non-flexible circuit substrate, wherein the Y electrodes are connected to the lead wiring via a through-hole part provided on the insulating layer,
 wherein a detection electrode S comprising two comb-shaped electrodes is disposed on a surface of the insulating layer, each electrode of the comb-shaped electrodes is disposed alternately with respect to the Y electrodes, the front ends of the combs are disposed opposite left to right, the comb-shaped electrodes are clustered as one electrode in the center in the Y direction, and these extend up to the predetermined through holes,
 wherein a protrusion dimension of a portion of the insulating layer which overlaps the extension section is shorter than a protrusion dimension of the extension section such that the insulating layer does not overlap an end portion of the lead wiring of the X and Y electrodes bundled in the extension section, the extension section having a plurality of extension holes, and
 wherein the X and Y electrodes are connected to the non-flexible circuit substrate provided on one surface of the extension section, and the other surface of the flexible substrate of the electrostatic-capacitance-type input sensor is bonded to the reverse surface of a curved portion of a support plate, and the other surface of the flexible substrate of the extension section is bonded to a flattened portion continuously disposed from the curved portion so that an input operation is conducted by performing a contact operation along the obverse surface of the curve portion without viewing the electrostatic-capacitance type input sensor and the circuit substrate from an outer surface.

2. An electrostatic-capacitance-type coordinate input device according to claim 1, wherein a recess to which the input sensor is fitted is formed on the rear surface of said support plate at a position where said input sensor is bonded.

3. An electrostatic-capacitance-type coordinate input device according to claim 1, wherein a pointing section for pointing a position of said input sensor is formed of a recessed portion or a projecting portion, a color display, or changes in surface roughness matching the shape of the input sensor.

4. A device, comprising;
 an input device having a coordinate-input sensor formed on a flexible substrate and having an electrode layer that includes a plurality of X electrodes and Y electrodes formed on one surface of the flexible substrate for detecting electrostatic capacitance, the X electrodes and Y electrodes having lead wiring;
 a device housing having an insulating layer having obverse and reverse sides the obverse side being exposed;
 wherein the input sensor is disposed on the reverse side of the insulating layer and an input operation is performable at the obverse side,
 wherein the coordinate-input sensor has an extension section, a non-flexible circuit substrate to which the electrodes are connected, the non-flexible circuit substrate being disposed on one surface of he extension section, the other surface of the flexible substrate of the input sensor being bonded to the reverse surface of a curved portion of a support plate, and the other surface of the flexible substrate of the extension section being bonded to a flattened portion of a support plate continuously disposed from the curved portion, so that an input operation is conducted by performing a contact operation along the obverse surface of the curve portion without viewing the electrostatic-capacitance type input sensor and the circuit substrate from an outer surface, wherein a detection electrode S comprising two comb-shaped electrodes is disposed on a surface of the insulating layer, each electrode of the comb-shaped electrodes is disposed alternately with respect to the Y electrodes, the front ends of the combs are disposed opposite left to right, the comb-shaped electrodes are clustered as one electrode in the center in the Y direction, and these extend up to the predetermined through holes, wherein the lead wiring of the X electrodes and the Y electrodes is bundled in the extension section and connected to the non-flexible circuit substrate, wherein the Y electrodes are connected to the lead wiring via a through-hole part provided on the insulating layer, and wherein a protrusion dimension of a portion of the insulating layer which overlaps the extension section is shorter than a protrusion dimension of the extension section such that the insulating layer does not overlap an end portion of the lead wiring of the X and Y electrodes bundled in the extension section, the extension section having a plurality of extension holes.

5. The device according to claim 4, wherein the input sensor is bonded to an arcuate section formed in the insulating portion.

6. The device according to claim 4, wherein the input sensor is bonded to a recessed area formed in the reverse side.

7. An electrostatic-capacitance-type coordinate input device according to claim 1, wherein the reverse surface of the flexible substrate corresponding to the extension section is bonded to a rear surface of a planar portion of the insulating support plate.

8. The device according to claim 4, wherein the reverse surface of the flexible substrate corresponding to the extension section is bonded to a rear surface of a planar portion of the insulating support plate.

* * * * *